(12) United States Patent
Mukherjee et al.

(10) Patent No.: US 12,145,518 B2
(45) Date of Patent: *Nov. 19, 2024

(54) MANAGING POWER IN AN INTEGRATED CIRCUIT FOR HIGH-SPEED ACTIVATION

(71) Applicant: Marvell Asia Pte, Ltd., Singapore (SG)

(72) Inventors: Shubhendu Sekhar Mukherjee, Southborough, MA (US); William Chu, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,151

(22) Filed: Aug. 23, 2023

(65) Prior Publication Data

US 2023/0391281 A1 Dec. 7, 2023

Related U.S. Application Data

(63) Continuation of application No. 16/930,976, filed on Jul. 16, 2020, now Pat. No. 11,766,975.

(60) Provisional application No. 62/875,439, filed on Jul. 17, 2019.

(51) Int. Cl.
*G06F 1/324* (2019.01)
*B60R 16/03* (2006.01)
*G06F 1/3293* (2019.01)
*G06F 9/4401* (2018.01)

(52) U.S. Cl.
CPC .............. *B60R 16/03* (2013.01); *G06F 1/324* (2013.01); *G06F 1/3293* (2013.01); *G06F 9/4406* (2013.01)

(58) Field of Classification Search
CPC ....... B60R 16/03; G06F 1/324; G06F 1/3293; G06F 9/4406; G06F 1/3243; G06F 1/3296; G06F 9/4405; G06F 1/08; G06F 15/7807; Y02D 10/00
See application file for complete search history.

(56) References Cited

U.S. PATENT DOCUMENTS

| | | |
|---|---|---|
| 5,724,527 A | 3/1998 | Karnik et al. |
| 6,195,597 B1 | 2/2001 | Yamada |
| 6,681,336 B1 | 1/2004 | Nakazato et al. |
| 7,765,412 B1 | 7/2010 | Burr et al. |
| 2009/0249094 A1 | 10/2009 | Marshall et al. |

(Continued)

FOREIGN PATENT DOCUMENTS

| | | |
|---|---|---|
| CN | 101981529 A | 2/2011 |
| CN | 104346199 A | 2/2015 |

*Primary Examiner* — Jaweed A Abbaszadeh
*Assistant Examiner* — Brian J Corcoran
(74) *Attorney, Agent, or Firm* — Young Basile Hanlon & MacFarlane, P.C.

(57) ABSTRACT

Controlling a vehicle comprises: providing, from an activation port, an activation signal for activating control of at least one of one or more electronically controllable devices during a high-speed activation time interval; and managing power consumed by an integrated circuit that includes two or more processor cores during the high-speed activation time interval. The managing includes: receiving the activation signal from the activation port, in response to the activation signal, executing at least a portion of stored code by a first subset of fewer than all of the processor cores at a first power level, and after the high-speed activation time interval, executing at least a portion of the stored code by a second subset of one or more of the processor cores at a second power level lower than the first power level.

19 Claims, 4 Drawing Sheets

(56) References Cited

U.S. PATENT DOCUMENTS

| | | |
|---|---|---|
| 2010/0174895 A1 | 7/2010 | Pierce et al. |
| 2012/0030454 A1 | 2/2012 | Book et al. |
| 2013/0179710 A1 | 7/2013 | Chang et al. |
| 2013/0205130 A1 | 8/2013 | Hallowell et al. |
| 2015/0039877 A1 | 2/2015 | Hall et al. |
| 2015/0067318 A1 | 3/2015 | Henry et al. |

MANAGING POWER IN AN INTEGRATED CIRCUIT FOR HIGH-SPEED ACTIVATION

CROSS-REFERENCE TO RELATED APPLICATION(S)

This application is a continuation of U.S. patent application Ser. No. 16/930,976, entitled, "MANAGING POWER IN AN INTEGRATED CIRCUIT FOR HIGH-SPEED ACTIVATION," filed on Jul. 16, 2020, which claims priority to and the benefit of U.S. Provisional Application Patent Ser. No. 62/875,439, entitled, "FREQUENCY SCALING TO REDUCE BOOT TIME," filed on Jul. 17, 2019, each of which is incorporated herein by reference.

TECHNICAL FIELD

This disclosure relates to managing power in an integrated circuit for high-speed activation.

BACKGROUND

In some processors, a clock frequency is dynamically increased relative to a default clock frequency in order to provide higher performance under certain conditions. For example, such clock frequency increases may occur after the computing system has booted up an operating system and is performing tasks that call for additional processing power. The clock frequency increase is generally subject to various power or temperature operating ranges of digital circuitry that contains one or more cores of the processor and other circuitry (e.g., circuitry of a system on-a-chip (SoC), CPU, GPU, or other integrated circuit).

The description above is presented as a general background relevant to this technical field and should not be construed as an admission that any of the information it contains constitutes prior art against the present patent application.

SUMMARY

In one aspect, in general, a vehicle comprises: one or more electronically controllable devices; a controller configured to manage power consumed by an integrated circuit in the controller during a high-speed activation time interval, the controller being configured to control at least one of the electronically controllable devices in the vehicle in response to receiving an activation signal, the controller including: two or more processor cores disposed on the integrated circuit, a storage module for storing code executable by two or more of the processor cores, and an overdrive manager configured to cause at least a portion of the stored code to be executed by a first subset of fewer than all of the processor cores at a first power level during the high-speed activation time interval, and at least a portion of the stored code to be executed by a second subset of one or more of the processor cores at a second power level lower than the first power level after the high-speed activation time interval; and an activation port configured to provide the activation signal for activating control of at least one of the electronically controllable devices by the controller.

Aspects can include one or more of the following features.

The controller is further configured to, after the high-speed activation time interval, execute at least a portion of the stored code by a processor core in the first subset at the second power level.

The first subset includes a single processor core, and the second subset includes one or more additional processor cores.

The controller is further configured to, during the high-speed activation time interval, prevent execution of any of the stored code by any processor core in the second subset.

The first subset and the second subset include different processor cores.

The storage module comprises a solid state drive.

The overdrive manager is configured to cause execution at the first power level by increasing a frequency of a first clock signal generated by a clock in a processor core in the first subset above a second frequency of a second clock signal generated by a clock in a processor core in the second subset.

The overdrive manager is further configured to cause execution at the first power level by increasing an amplitude of a voltage of the first clock signal above a default voltage amplitude.

In another aspect, in general, a method for controlling a vehicle comprises: providing, from an activation port, an activation signal for activating control of at least one of one or more electronically controllable devices during a high-speed activation time interval; and managing power consumed by an integrated circuit that includes two or more processor cores during the high-speed activation time interval. The managing includes: receiving the activation signal from the activation port, in response to the activation signal, executing at least a portion of stored code by a first subset of fewer than all of the processor cores at a first power level, and after the high-speed activation time interval, executing at least a portion of the stored code by a second subset of one or more of the processor cores at a second power level lower than the first power level.

Aspects can include one or more of the following features.

The managing further comprises, after the high-speed activation time interval, executing at least a portion of the stored code by a processor core in the first subset at the second power level.

The first subset includes a single processor core, and the second subset includes one or more additional processor cores.

The managing further comprises, during the high-speed activation time interval, preventing execution of any of the stored code by any processor core in the second subset.

Executing the portion of the stored code by the first subset includes executing code for booting at least a portion of an operating system.

Executing the portion of the stored code by the processor core in the first subset after the high-speed activation time interval includes executing code within the operating system to control an electronically controllable device in a first subsystem of the vehicle associated with at least one of: a powertrain, steering, accelerating, or decelerating.

Executing the portion of the stored code by a processor core in the second subset after the high-speed activation time interval includes executing code to control an electronically controllable device in a second subsystem of the vehicle different from the first subsystem of the vehicle.

The method further comprises terminating high-speed activation time interval in response to an indication that the booting has completed.

Executing at the first power level includes increasing a first frequency of a first clock signal generated by a clock in a processor core in the first subset above a second frequency of a second clock signal generated by a clock in a processor core in the second subset.

Executing at the first power level includes increasing an amplitude of a voltage of the first clock signal above a default voltage amplitude.

The first frequency is increased to at least 50% higher than the second clock frequency.

The first frequency is increased to at least twice the second clock frequency.

Aspects can have one or more of the following advantages.

When a computing system operates within some environments, such as a vehicle, there may be more demanding operating requirements than for other environments. For example, a vehicle such as an automobile has various standards that call for certain subsystems to be ready to operate (e.g., to start driving) within a predetermined time period. For some automobiles, that time period is associated with the time it takes for an internal combustion engine (ICE) to start up (e.g., less than 2 seconds), in some cases even if that automobile uses an alternative form of power other than an ICE (e.g., a battery). Many of the subsystems of the automobile need to be available to operate within that predetermined time period. Some of those subsystems are controlled by a controller. To meet that subsystem startup requirement, there is typically a stricter startup requirement for the controller, which often contains an SoC with processor cores that need to boot up at least a portion of operating system software. The startup (or "boot time") requirement for some SoCs is less than 100 ms or less than 200 ms. This boot time is measured from the time an activation signal is received. The activation signal can be generated in response to a user interaction with the automobile, such as turning a key or pushing a button, for example. It is challenging for some complex SoCs to meet this requirement in a cost-effective manner. The techniques described herein facilitate a short boot time, with minimal or no additional cost, and with minimal or no effect on the aging of the processor cores of the SoC. For example, some processor cores are designed such that the internal circuitry and components are able to operate for at least a predetermined lifetime with certain assumptions on the operating conditions. In some cases, one of those operating conditions is an amount of power dissipated over time and the associated stress on the components that occurs with such power dissipation. One of the operating characteristics that affects the power dissipation is clock frequency. In some cases, other characteristics also affect power dissipation such as voltage and associated current flow and resistive heating. Since the processor overdrive used to reduce boot time does not call for long periods of increased clock frequency, there is minimal increased stress on processor components.

Other features and advantages will become apparent from the following description, and from the figures and claims.

BRIEF DESCRIPTION OF THE DRAWINGS

The disclosure is best understood from the following detailed description when read in conjunction with the accompanying drawings. It is noted that, according to common practice, the various features of the drawings are not to-scale. On the contrary, the dimensions of the various features are arbitrarily expanded or reduced for clarity.

DETAILED DESCRIPTION

Figure 1:
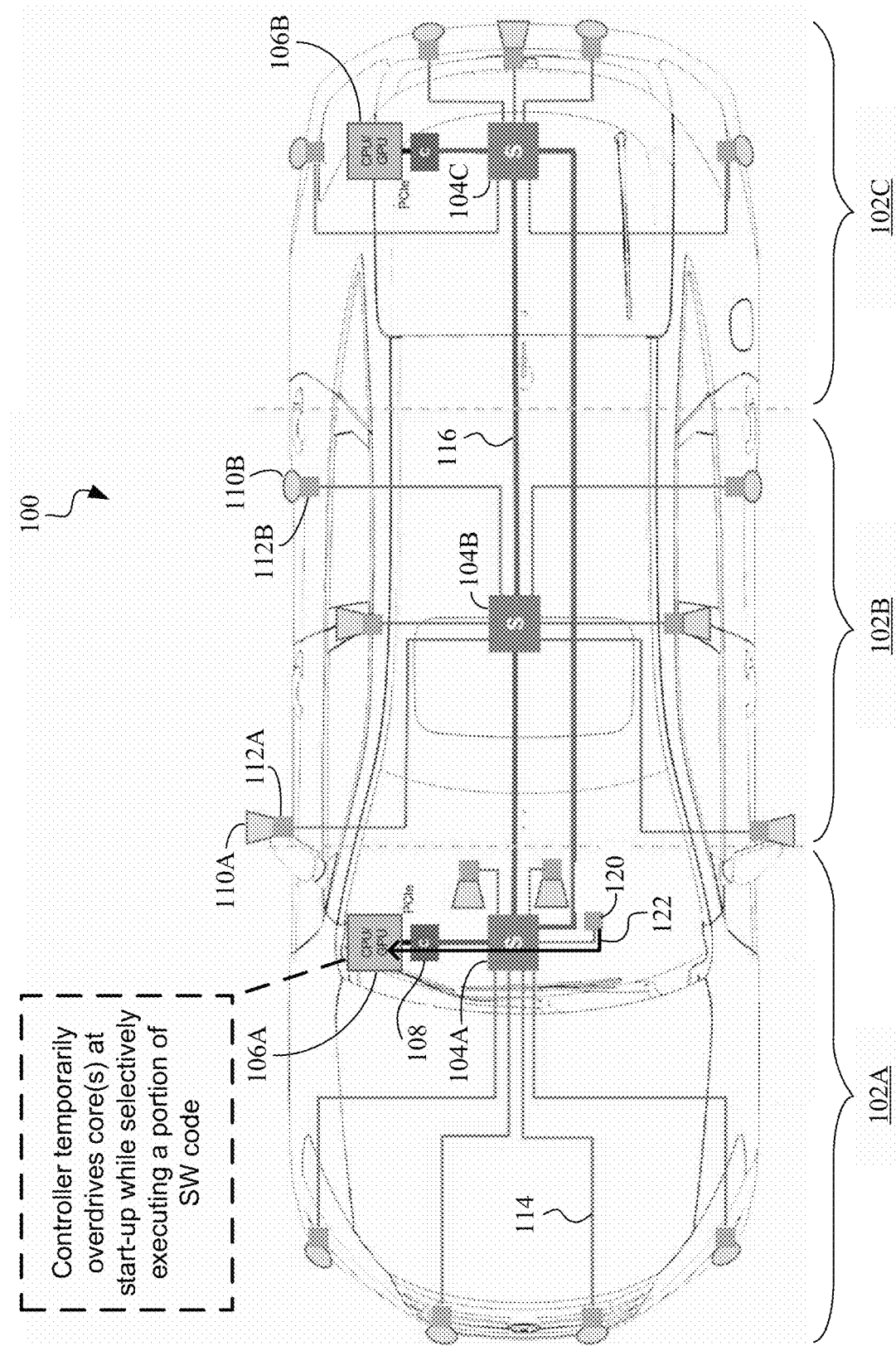
FIG. 1 is a pictorial diagram of an example vehicle in accordance with an embodiment of the present disclosure.

FIG. 1 is a pictorial diagram showing an example of vehicle 100 in which various aspects, features, and elements described herein can be implemented in accordance with an embodiment of this disclosure. The vehicle 100 includes a communications network (or simply "network") that enables communication among different subsystems in the vehicle 100, and electronic control of electronically controllable devices within those subsystems. The network may have any of a variety of network topologies. In some implementations, the communication medium of the network comprises a shared medium, such as a bus, to which different nodes are connected. In some implementations, certain nodes are connected to other nodes (e.g., a switch node) over a point-to-point link. In the example of FIG. 1, the network includes multiple network segments configured to provide for communication and control over multiple zones 102A-102C within the vehicle 100. A front zone network segment 102A includes a switch 104A that serves as a gateway to the network segment 102A, a middle zone network segment 102B includes a switch 104B that serves as a gateway to the network segment 102B, and a back zone network segment 102C includes a switch 104C that serves as a gateway to the network segment 102C. In this example, the front zone network segment 102A and the back zone network segment 102C include respective device controllers 106A and 106B that provide control functionality for various subsystems in the vehicle 100. In this example, the middle zone network segment 102B is configured to enable communication with various sensor modules, but does not include a dedicated controller. The controller 106A is connected to a network controller 108 that couples the controller 106A to the network through the switch 104A. The network controller 108 is configured to link the controller 106A to various subsystems and modules in the vehicle 100. One control function that is provided by the controller 106A is to temporarily overdrive a processor core at start-up and selectively executing a portion of software code while the processor core is being overdriven. This overdrive functionality facilitates a faster start-up of certain electronically controllable devices within the vehicle 100, as described in more detail below.

In an embodiment of the present disclosure, the controllers and switches are implemented, for example, using a system-on-a-chip (SoC) or other electronic circuitry that includes one or more processor cores. A given processor core can be configured as a generalized unit such as a central processing unit (CPU), a special purpose unit such as a graphics processing unit (GPU), and/or other form of processing circuitry. For example, some controllers are implemented using one or more special purpose processors, one or more digital signal processors, one or more microprocessors, one or more controllers, one or more microcontrollers, one or more integrated circuits, one or more Application Specific Integrated Circuits (ASICs), one or more Field Programmable Gate Arrays, one or more programmable logic arrays, one or more programmable logic controllers, one or more state machines, or any combination thereof. The controllers are able to execute programs based on stored code, including code stored in storage module comprising any tangible non-transitory computer-usable or computer-readable medium, capable of, for example, containing, storing, communicating, or transporting machine readable instructions, or any information associated therewith, for use by or in connection with the controller. For example, the storage module can include any suitable form of volatile or non-volatile memory including one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any suitable combination thereof.

Examples of the kind of sensor modules that are suitable to be included, in any of the zones of the vehicle, include an imaging/navigation sensor 110A (e.g., video camera, radar, LiDAR, rangefinders or other proximity sensors, velocity sensors, accelerometers, infrared-sensing, acoustic-sensing (including ultrasonic sensors), GPS, etc.), and an environmental/user-interface sensor 110B (e.g., mass air flow, engine speed, acceleration, braking, traction, oxygen, fuel temperature, pressure, voltage, steering wheel position, seating position, eye tracking, etc.). The imaging/navigation sensor 110A provides data to the network through a communication bridge 112A, and the environmental/user-interface sensor 110B provides data to the network through a communication bridge 112B. These communication bridges are configured according to a communication protocol to facilitate transmission of messages, data, signals, or other information that is used to operate and control electronically controllable sensor modules.

There are typically a large number of subsystems of the vehicle that include electronically controllable devices that are also configured to be controlled by one or more of the controllers. For example, some of these subsystems are associated with the vehicle's chassis, wheels, or powertrain (e.g., including a power source, suspension, drive shaft, axles, and exhaust system). The power source, such as an internal combustion engine, an electric motor, or a combination of an internal combustion engine and an electric motor, are operative to provide kinetic energy as a motive force to one or more of the wheels. There may also be a large number of driver controls (e.g., for power-up/ignition, steering, acceleration, and braking) and displays, or other user interface input and output elements, that are in communication with the network. Also, alternative types of vehicles, other than automobiles, sometimes include other subsystems including subsystems for other types of propulsion, such as a propellers for aerial vehicles. Any of a variety of modules of these subsystems can be electronically controllable devices that are controlled, at least in part, based on signals sent to or from one or more of the controllers. Communication nodes associated with these subsystems in different network segments communicate with other subsystems, such as the powertrain, the wheels, or both, for example, to control the vehicle 100, such as accelerating, decelerating, steering, or otherwise controlling the vehicle 100.

There are various types of communication media that connect different nodes of the network. The switches and communication bridges are able to be interconnected by cables for transmitting encoded signals (e.g., signals encoded using amplitude and/or phase of a transmitted wave according to a suitable protocol). In some cases, there are different types of cables between different types of nodes, some of which may have different physical characteristics such as length, bandwidth capacity, and/or shielding materials. For example, one type of cable 114 may be used between a sensor bridge and a switch, and another type of cable 116 may be used between different switches. The cables in some embodiments include one or more communication media such as electrical wiring and/or optical fiber. The switches and communication bridges are configured to include circuitry for providing appropriate functionality according to particular communication protocols in a layered protocol stack. For example, a PHY layer protocol can be used by a transceiver that includes circuitry for transmitting signals onto a communication medium and circuitry for receiving signals from the communication medium. In some implementations, there is separate transmitter circuitry and receiver circuitry, and circuitry to control whether the transmitter or receiver is actively accessing the communication medium. A MAC layer can be used by a medium access controller that controls access by the transceiver to the communication medium. Other types of cables are also typically included in the vehicle 100, such as cables for delivering electrical power. For example, the control switches, controllers, and sensors can be configured to receive power from the powertrain over a power delivery network.

Figure 2:
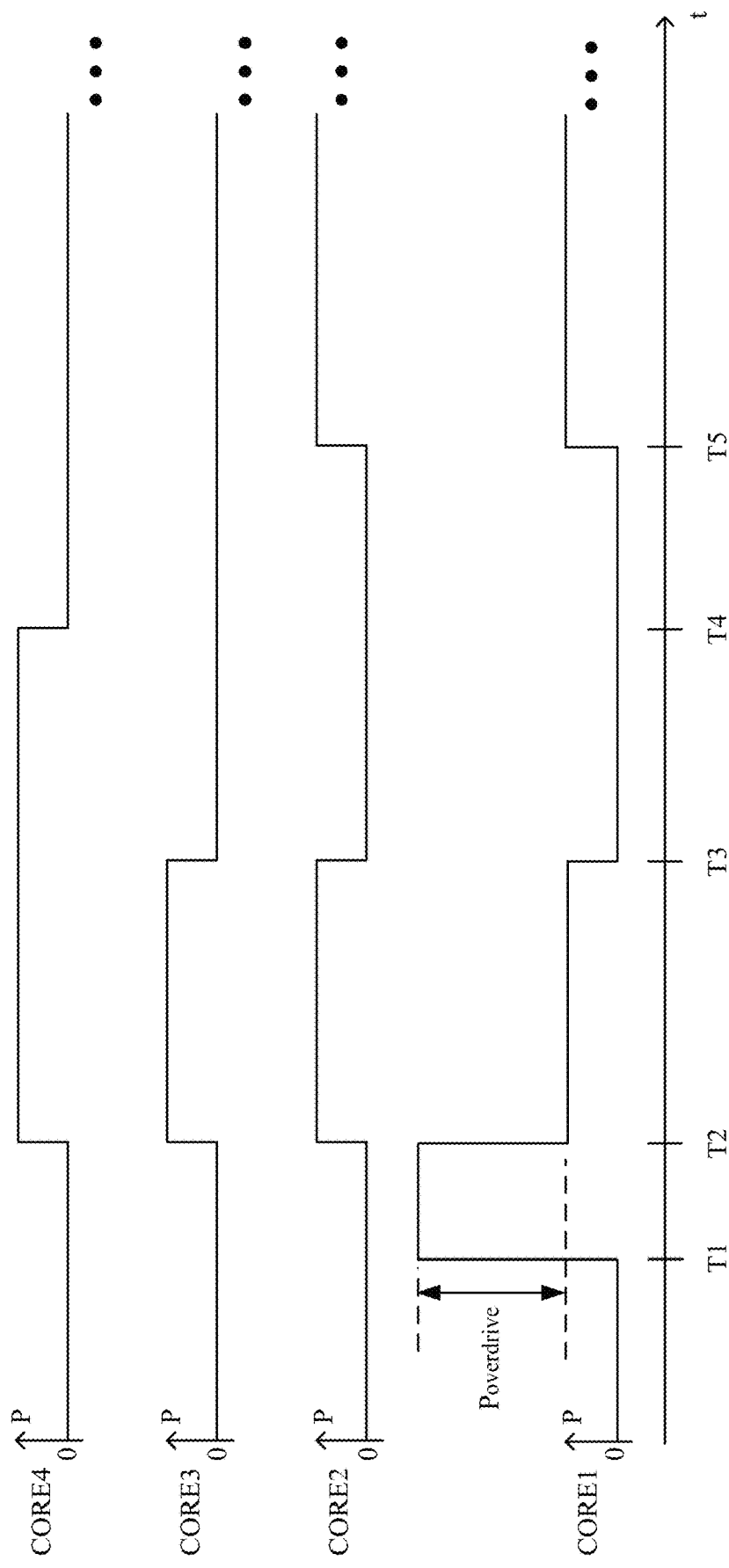
FIG. 2 is a plot of an example timing pattern for powering multiple processor cores in control circuitry of the vehicle of FIG. 1.

FIG. 2 shows a set of timing plots in which power is plotted as a function of time for each of four processor cores, CORE1, CORE2, CORE3, and CORE4, within an integrated circuit for the controller 106A. The clock frequencies of the processor cores, which determine a rate at with the processor core performs computations and how much power is consumed to do so, is managed by an overdrive manager 418A, as described in more detail below (with reference to FIG. 4). In this example, a user-interface module 120 provides an activation signal 122 from an activation port on the user-interface module 120 in response to detecting a user interaction that indicates an intention to activate (or "start up," or "turn on") the vehicle 100. The user interaction can include any of a variety of actions, such as turning a key (e.g., in an ignition assembly, or a virtual ignition interface), pushing a button within the automobile or on a key fob or other form of remote control, speaking a command (into a microphone), making a gesture (in front of a camera), or completing a sequence of actions (e.g., a sequence that includes opening and/or closing a driver's door).

The overdrive manager within the controller 106A is configured to manage power consumed by the processor cores on the integrated circuit (e.g., an SoC) during a high-speed activation time interval. In the example illustrated in FIG. 2, the initial state of each of the four processor cores is an idle or off state in which no significant power is being consumed. For example, the vehicle 100 may be parked and inactive. At time T1, the activation signal 122 is received by the controller 106A. In response, the controller 106A performs a high-speed activation procedure that temporarily overdrives CORE1 to selectively execute a portion of software code that performs a start-up function. For example, in some implementations CORE1 executes boot code that boots an operating system so that control programs are able to run within that operating system to control any number of the electronically controllable devices of the various subsystems in the vehicle 100 that need to be able to respond quickly when a user wishes to operate the vehicle 100. The controller 106A overdrives CORE1 by setting its clock frequency to an increased value such that CORE1 uses an increased amount of power over a default power level to which CORE1 is limited during normal operation, labeled as $P_{overdrive}$ in FIG. 2. The clock of CORE1 is set to this higher power (about 4 times higher than a default power level in this example) for a predetermined amount of time until, at time T2, CORE1 has completed booting its operating system, or has completed booting (or is assumed to have completed booting) a sufficient portion of the operating system to enable certain critical control functionality for the critical electronically controllable devices within the vehicle 100 to be able to function. Other levels of overdrive are used in other embodiments including higher multiples, or lower multiples (e.g., higher than a default power level by 50% or 100%). In some embodiments, the critical control functionality includes functions that are time critical for interaction with a user (e.g., dashboard displays, backup camera displays) are booted in overdrive mode, while other control functionality that is not required to be used immediately (e.g., entertainment system displays, or navigational displays) are booted at default power and clock frequency.

In some embodiments, more than one processor core can be subject to power overdrive during start-up, but in other embodiments, it may be sufficient to only overdrive a single processor core without subjecting more processor cores to the potential stress of being overdriven. In some embodiments, the particular processor core that is subject to power overdrive is rotated among multiple processor cores. Alternatively, in some embodiments, a power budget is predetermined, and concurrent start-up of one or more processor cores is performed at overdrive power levels provided that the power budget is not exceeded. In some embodiments, other operating parameters are changed in addition to clock frequency. For example, in some embodiments, the overdrive manager is also configured to temporarily increase the amplitude of the clock voltage, and/or voltages used by other processor components, when the clock frequency is temporarily increased.

The operating system (OS) is any of a variety of suitable types of OS s, such as Linux, or RTLinux, a real-time operating system (RTOS) microkernel that runs the Linux OS as a fully preemptive process. In some implementations, the OS software that is loaded during high-speed activation is a reduced version of the OS (e.g., including only selected software modules) that has a reduced size (e.g., 20 Mbytes) that is faster to boot.

The amount of power consumed by a processor core in some integrated circuits is approximately proportionate to the clock frequency. There is also typically a limit on the amount of power that a processor core is designed to consume, and consuming more power than that limit over a significant amount of its operational lifetime could have a detrimental effect on the length of that operational lifetime and/or performance over that operational lifetime. So, while extended operation at a power level exceeding the default power is not feasible, infrequent and short burst periods of time operating in "overdrive" exceeding that default power has a negligible, or acceptable, detrimental effect. In some implementations, along with an increase in the frequency of a clock signal, operating in overdrive includes an increase in a voltage level (i.e., a voltage for a logical high level) of the clock signal. In some implementations, while CORE 1 is booting its OS, the other processor cores are kept in the idle or off state (e.g., a state in which none of the software modules, or the OS software, is executing) to further control the total amount of power being consumed in the integrated circuit during high-speed activation.

In this example, after CORE 1 has booted, the controller 106A sets the other processor cores CORE2, CORE3, and CORE4 to use the default clock frequency so that a default amount of power is used while booting their operating systems. While these processor cores are booting up, during between times T2 and T3, CORE1 is able to perform control functions using the default clock frequency, and corresponding default power level. After the other processor cores have completed booting their operating systems, one or more of the processor cores are able to continue to function at the default clock frequency and default power level, such as CORE4 in this example, and other processor cores are able to be put into a low-power mode if they are not needed at that time. During the low-power mode the clock frequency is reduced, or the clock is turned off completely, to preserve power, but since the operating systems have already loaded, the low-power mode is able to be exited quickly. In this example, CORE1, CORE2, and CORE3 are put into low power mode at T3, and CORE4 is put into low-power mode at T4. Then, at T5 CORE1 and CORE2 resume at the default clock frequency and default power.

Figure 3:
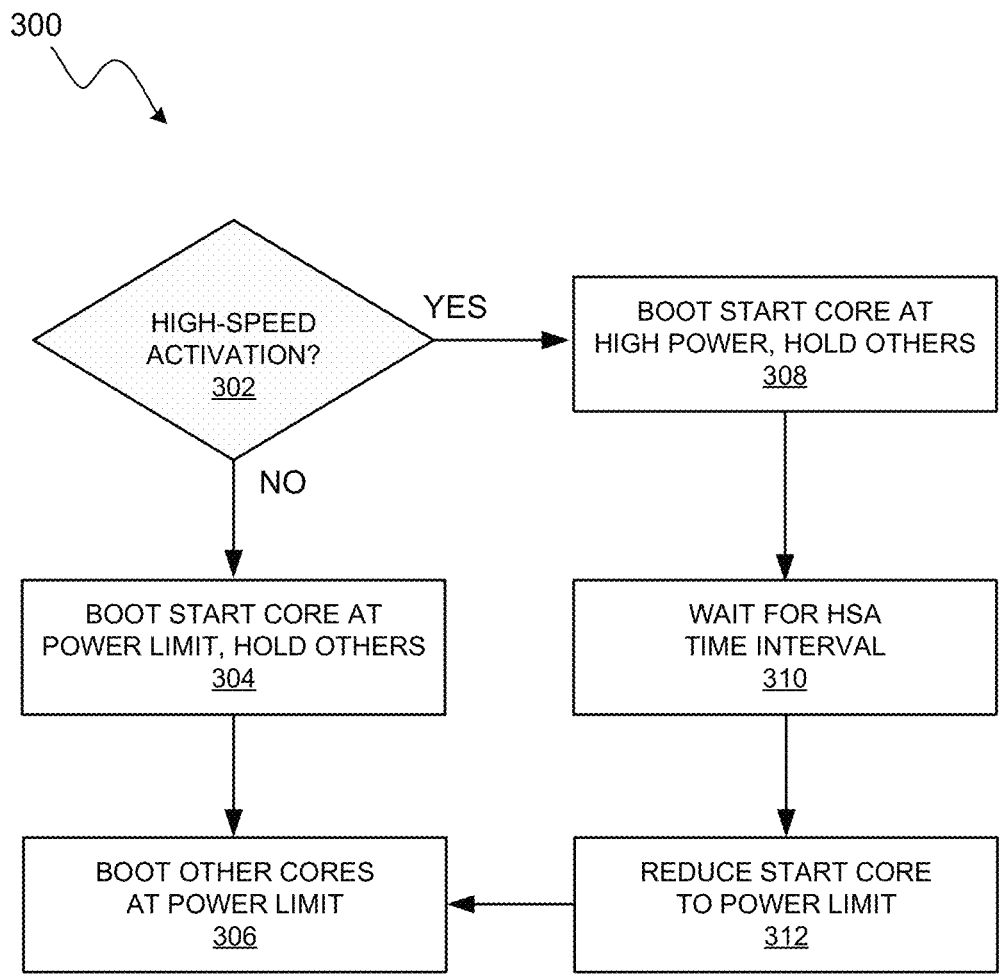
FIG. 3 is a flowchart of an example procedure for controlling high-speed activation using the processor cores in the vehicle of FIG. 1.

FIG. 3 show an example high-speed activation procedure 300 that can be used by various nodes in the network such as the controllers, including the controller 106A, and/or switches, including the gateway switch 104B. The procedure 300 is used to selectively overdrive one processor core (called a "start core") at a high power (over a nominal "power limit") for a limited high-speed activation (HSA) time interval. But, there is a HSA mode that determines whether or not high-speed activation will be used. For example, a stored variable is able to be set to turn the HSA mode on or off. A mode-check step determines (302) whether or not high-speed activation will be used. If not, then the procedure 300 boots (304) the start core at the power limit, and the holds other processor cores in the idle state. After the start core has booted, the procedure 300 boots (306) the other processor cores at the power limit. If the mode-check step determines that high-speed activation will be used, then the procedure boots (308) the start core at a high power above the power limit and holds the other processor cores in the idle state. The procedure 300 then waits for a predetermined HSA time interval (e.g., 500 ms) that is sufficient for the start core to boot in overdrive. The procedure 300 then reduces the start core to the power limit. The procedure then boots (306) the other processor cores at the power limit. Alternative implementations of a high-speed activation procedure can use other steps or conditions such as, for example, overdriving a selected group of multiple start cores consisting of a subset of fewer than all of the processor cores. Or, in some implementations, instead of waiting for a predetermined amount of time, the start core sends a notification after the boot has completed, which indicates that the power is to be reduced and the other processor cores are to be booted.

The amount by which the processor core (or cores) are overdriven over the nominal power limit depends on the normal operating range of a given integrated circuit. For example, the processor cores in some SoCs are designed to use a nominal power that corresponds to the clock running at a nominal frequency (e.g., 500 MHz). But, for limited amounts of time, the clock frequency is able to be increased by a predetermined multiple (e.g., 3 times faster, 4 times faster, or 5 times faster).

Figure 4:
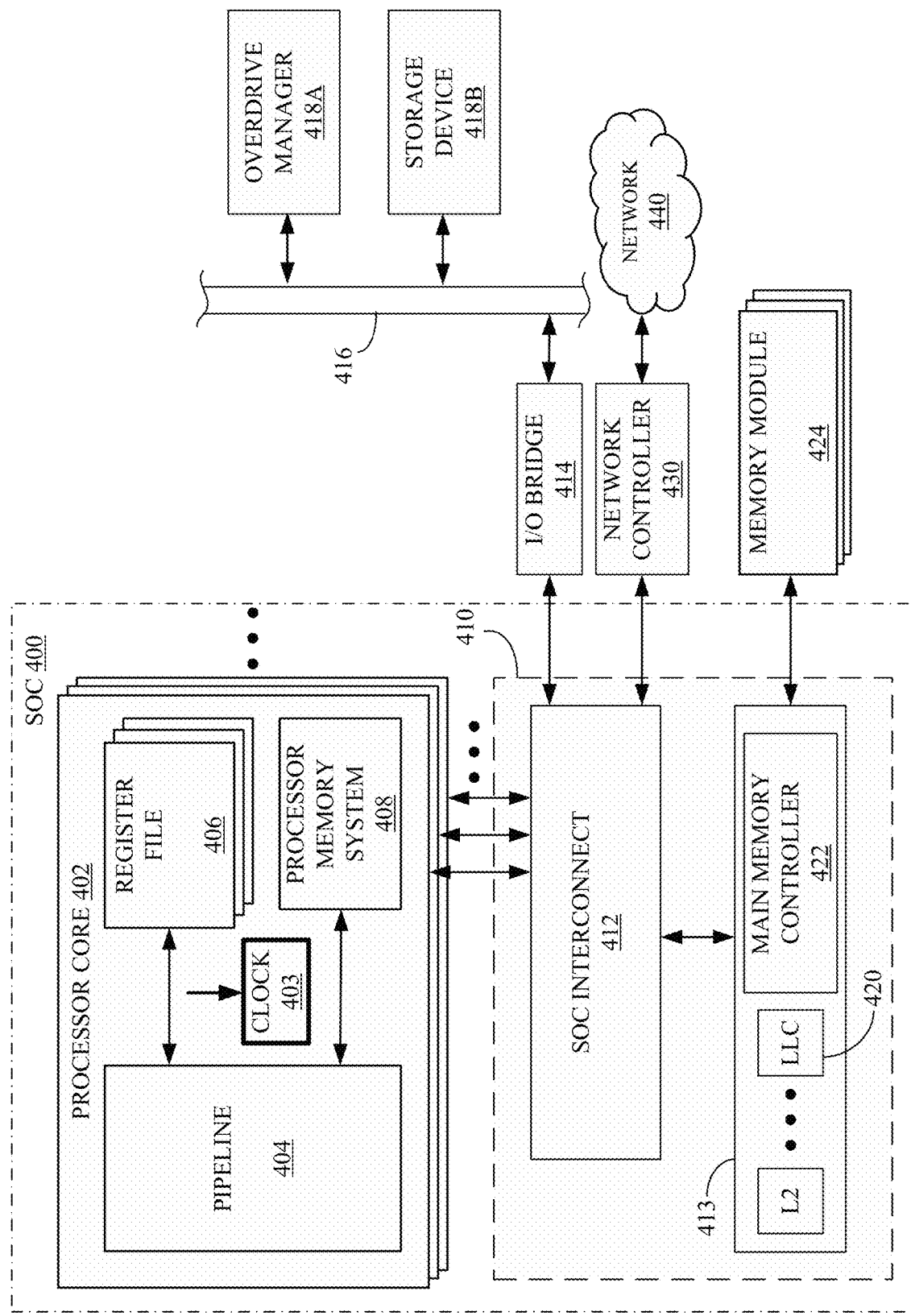
FIG. 4 is a schematic diagram of an example system on a chip that includes the processor cores deployed in the vehicle of FIG. 1.

FIG. 4 is a schematic diagram showing an example of a SoC 400 that is suitable for use in the controllers, switches, or other electronic systems described herein. The SoC 400 has a multi-core architecture that includes multiple processor cores (or simply "cores") 402, where each processor core 402 typically includes a clock 403, a pipeline 404, one or more register files 406, and a processor memory system 408. The clock 403 has an input that determines the frequency of a clock signal (e.g., a square wave) used to synchronize digital circuitry within the processor core 402. Each processor core 402 is connected to a communication and memory system 410, which includes an SoC interconnect 412 (e.g., bus, cross-bar switch, mesh network, etc.) and an external memory system 413. The SoC interconnect 412 enables communication with the external memory system 413, an input/output (I/O) bridge 414, and a network controller 430. The I/O bridge 414 enables communication over an I/O bus 416, with various different I/O devices including an overdrive manager 418A, and a storage device 418B.

The overdrive manager 418A manages the clock frequency of each of the processor cores during the high-speed activation procedure 300, as described herein. In some implementations, the overdrive manager 418A comprises dedicated hardware and/or firmware, or alternatively comprises another core or separate processor. The storage device 418B typically includes a hard disk drive, solid state drive (SSD), or other (typically non-volatile) storage medium, which stores a variety of program code and other information, including code of an operating system that is loaded into main memory during a boot process of the high-speed activation procedure 300. To facilitate a fast booting of the operating system, in an embodiment the storage device 418B includes a fast non-volatile storage medium, such as a NVMe SSD, and the I/O bus 416 is configured to use a fast communication medium such as PCIe. The storage device 418B is also able to spare some space to serve as secondary storage (or a 'backing store') in a virtual memory scheme for the (typically volatile) main memory. The network controller 430 couples the SoC 400 to a network 440, such as the communication network of the vehicle 100. In other examples, the network controller 430 is connected to the I/O bus 416 instead of directly to the SoC interconnect 412.

The processor memory system 408 and external memory system 413 together form a hierarchical memory system including at least a first level (L1) cache within the processor memory system 408, and any number of higher level (L2, L3, . . . ) caches within the external memory system 413 (i.e., the portion of the hierarchical memory system that is external to the processor cores). At each cache level, the cache can include a module that provides an instruction cache for caching instructions, and separate module that provides a data cache for caching data. The memory system will load blocks of instructions or data into entries and evict blocks of instructions or data from entries in units cache blocks (also called cache lines). A memory page includes a number of cache blocks, respective cache blocks including a number of words, each word consisting of a predetermined number of bytes. In addition to an L1 instruction cache and data cache, the processor memory system 408 includes a translation lookaside buffer (TLB) for caching recent translations, and various other circuitry for handling a miss in the L1 instruction or data caches or in the TLB. For example, in some embodiments, that circuitry in the processor memory system 408 of a processor core 402 includes a write buffer for temporarily holding values to be written from a store instruction being executed within the pipeline 404.

The highest level cache within the external memory system 413 (which in some embodiments is the L2 cache if there are only two levels in the hierarchy) is the last level cache (LLC) 420, which is accessed just before main memory. Of course, this is only an example. The exact division between which level caches are within the processor memory system 408 and which are in the external memory system 413 can be different in other examples. For example, the L1 cache and the L2 cache could both be internal to the processor core 402, and the L3 (and higher) caches could be external to the processor core 402. Each processor core 402 could have its own internal L1 cache, and the processor cores could share an L2 cache. The external memory system 413 also includes a main memory controller 422, which is connected to any number of memory modules 424 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 404 includes multiple stages through which instructions advance, a cycle at a time. Some stages occur in a front-end portion of the pipeline. An instruction is fetched (e.g., in an instruction fetch (IF) stage or stages). Instructions are fetched based on a program counter (PC), which is a pointer that is used to identify instructions within memory (e.g., within a portion of main memory, or within an instruction cache of the processor). The PC is able to advance through addresses of a block of compiled instructions (called a "basic block"), incrementing by a particular number of bytes (depending on how long each instruction is and on how many instructions are fetched at a time). An instruction is then decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction is then ready to be issued. Issuing an instruction starts progression of the instruction through stages in a back-end portion of the pipeline to execute the instruction. Execution may involve applying the instruction's operation to its operand(s) to produce a result for an arithmetic logic unit (ALU) instruction, storing or loading to or from a memory address for a memory instruction, or may involve evaluating a condition of a conditional branch instruction to determine whether or not the branch will be taken. After an instruction has completed execution, the instruction is able to be committed so that any effect of the instruction is made globally visible to software. Committing an instruction may involve storing a result in a register file 406 (e.g., in a write back (WB) stage or stages), for example. In most implementations, even if any instructions were issued out-of-order, all instructions are generally committed in-order.

While the disclosure has been described in connection with certain embodiments, it is noted that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system-on-a-chip (SoC) comprising:
   a first set of two or more processor cores configured to execute code, during operation of the SoC following activation, using an amount of power lower than a nominal power limit;
   a second set of one or more processor cores, the second set of one or more processor cores constituting a subset of processor cores among the first set of two or more processor cores, configured to execute code during an activation time interval using an amount of power greater than the nominal power limit to boot functionality of the SoC;
an interconnect configured to communicate with two or more electronically controllable devices; and
circuitry configured to cause:
  after the activation time interval, the second set of one or more processor cores to execute code during continued operation using an amount of power lower than the nominal power limit,
  after booting functionality of the SoC, at least one processor core that is in the first set or the second set to execute code to activate control of a first electronically controllable device of the two or more electronically controllable devices, and
  after activating control of the first electronically controllable device, at least one processor core that is in the first set or the second set to execute code to activate control of a second electronically controllable device of the two or more electronically controllable devices different from the first electronically controllable device.

2. The SoC of claim 1, wherein the second set includes a single processor core, and the first set includes one or more additional processor cores in addition to the single processor core of the second set.

3. The SoC of claim 1, wherein the SoC is further configured to, during the activation time interval, prevent execution of any of the code by any processor core in the first set that is not in the second set.

4. The SoC of claim 1, wherein the SoC is configured to retrieve the code from a storage module that comprises a solid state drive.

5. The SoC of claim 1, wherein the SoC is configured to cause execution at a first power level greater than the nominal power limit by increasing a first frequency of a first clock signal generated by a clock in a processor core in the second set above a second frequency of a second clock signal generated by a clock in a processor core not in the second set.

6. The SoC of claim 5, wherein the SoC is further configured to cause execution at the first power level by increasing an amplitude of a voltage of the first clock signal above a default voltage amplitude.

7. The method of claim 1, wherein:
the at least one processor core that is in the first set or the second set caused to activate control of the first electronically controllable device is in the second set, and
the at least one processor core that is in the first set or the second set caused to activate control of the second electronically controllable device is not in the second set.

8. A method comprising:
receiving an activation signal initiating an activation time interval; and
managing power consumed by a system-on-a-chip (SoC) that includes a first set of two or more processor cores configured to execute code, during operation of the SoC following the activation time interval, using an amount of power lower than a nominal power limit, the managing including:
  in response to the activation signal, executing code by a second set of one or more processor cores constituting a subset of processor cores among the first set of two or more processor cores during the activation time interval using an amount of power greater than the nominal power limit to boot functionality of the SoC, and
  after the activation time interval, executing code by the second set of one or more of the processor cores using an amount of power lower than the nominal power limit; and
activating control of two or more electronically controllable devices, including:
  after booting functionality of the SoC, executing code by at least one processor core that is in the first set or the second set to activate control of a first electronically controllable device of the two or more electronically controllable devices, and
  after activating control of the first electronically controllable device, executing code by at least one processor core that is in the first set or the second set to activate control of a second electronically controllable device of the two or more electronically controllable devices different from the first electronically controllable device.

9. The method of claim 8, wherein the second set includes a single processor core, and the first set includes one or more additional processor cores in addition to the single processor core of the second set.

10. The method of claim 8, wherein the managing further comprises, during the activation time interval, preventing execution of any of the code by any processor core in the first set that is not in the second set.

11. The method of claim 8, wherein executing the code by the second set to boot functionality of the SoC includes executing code for booting at least a portion of an operating system.

12. The method of claim 11, further comprising terminating high-speed activation time interval in response to an indication that the booting of at least a portion of the operating system has completed.

13. The method of claim 8, wherein executing at a first power level greater than the nominal power limit includes increasing a first frequency of a first clock signal generated by a clock in a processor core in the second set above a second frequency of a second clock signal generated by a clock in a processor core not in the second set.

14. The method of claim 13, wherein executing at the first power level includes increasing an amplitude of a voltage of the first clock signal above a default voltage amplitude.

15. The method of claim 13, wherein the first frequency is increased to at least 50% higher than the second clock frequency.

16. The method of claim 15, wherein the first frequency is increased to at least twice the second clock frequency.

17. The method of claim 8, wherein:
the executing code by at least one processor core that is in the first set or the second set to activate control of the first electronically controllable device comprises executing the code by at least one processor core that is in the second set to activate control of the first electronically controllable device, and
the executing code by at least one processor core that is in the first set or the second set to activate control of the second electronically controllable device comprises executing the code by at least one processor core that is not in the second set to activate control of the second electronically controllable device.

18. The method of claim 17, wherein executing the code by the first processor core includes executing code within the operating system to control the first electronically controllable device in a first subsystem of a vehicle associated with at least one of: a powertrain, steering, accelerating, or decelerating.

19. The method of claim 18, wherein executing the code by the second processor core includes executing code to control the second electronically controllable device in a second subsystem of the vehicle different from the first subsystem of the vehicle.

\* \* \* \* \*